US009998688B2

(12) United States Patent
Ben-Bassat (10) Patent No.: US 9,998,688 B2
(45) Date of Patent: Jun. 12, 2018

(54) THERMAL IMAGING DEVICE AND A METHOD FOR USING SAME (71) Applicant: PLANXWELL LTD., Ganey Tikva (IL)

(72) Inventor: David Ben-Bassat, Ganey Tikva (IL)

(73) Assignee: ORYX VISION LTD., Petah Tikva (IL)

( * ) Notice: Subject to any disclaimer, the term of this patent is extended or adjusted under 35 U.S.C. 154(b) by 0 days. days.

(21) Appl. No.: 15/522,795

(22) PCT Filed: Oct. 18, 2015

(86) PCT No.: PCT/IL2015/000045
§ 371 (c)(1),
(2) Date: Apr. 28, 2017

(87) PCT Pub. No.: WO2016/067275
PCT Pub. Date: May 16, 2016

(65) Prior Publication Data
US 2017/0339352 A1    Nov. 23, 2017

Related U.S. Application Data (60) Provisional application No. 62/069,324, filed on Oct. 28, 2014.

(51) Int. Cl.
*H04N 5/33* (2006.01)
*G01J 5/10* (2006.01)
(Continued)

(52) U.S. Cl.
CPC .................. *H04N 5/33* (2013.01); *G01J 5/10* (2013.01); *G01J 5/602* (2013.01); *G01S 17/87* (2013.01); *G02B 5/208* (2013.01)

(58) Field of Classification Search
CPC .. H04N 5/33; H04N 5/332; G01J 5/10; G01N 5/602
See application file for complete search history.

(56) References Cited

U.S. PATENT DOCUMENTS

5,748,359 A    5/1998  Shen
8,324,564 B1*  12/2012 Pinkus ................... G01D 18/00
                                          250/252.1
(Continued)

*Primary Examiner* — David Porta
*Assistant Examiner* — Faye Boosalis
(74) *Attorney, Agent, or Firm* — Browdy and Neimark, PLLC (57) ABSTRACT A method and apparatus are provided for generating a thermal image of a target. The method comprises: at one or more electro-magnetic transducers, receiving long wave infra-red (LWIR) radiation emitted from the target; illuminating the electro-magnetic transducers with radiation being transmitted wavelengths that belong to Near Infra-Red (NIR) band and/or that belong to the visible (VIS) band; converting at least part of the radiation received as LWIR radiation to energy at the NIR band and/or at the VIS band; and generating a thermal image based on the energy retrieved after converting at least part of the LWIR radiation received, to energy at the NIR band and/or at the VIS band, and wherein receiving the LWIR radiation and illuminating the electro-magnetic transducers, are carried out simultaneously.

12 Claims, 4 Drawing Sheets

(51) Int. Cl.
*G02B 5/20* (2006.01)
*G01S 17/87* (2006.01)
*G01J 5/60* (2006.01)

(56) References Cited

U.S. PATENT DOCUMENTS

2005/0082480 A1 4/2005 Wagner
2008/0291108 A1 11/2008 Holly

* cited by examiner

THERMAL IMAGING DEVICE AND A METHOD FOR USING SAME

TECHNICAL FIELD

The present disclosure generally relates to methods for using optical devices, and more particularly, to thermal imaging devices and methods for using them.

BACKGROUND

Thermal imaging devices are devices that are operative to detect radiation in the infrared (IR) range of the electromagnetic spectrum (roughly at 8,000-14,000 nanometer, i.e. 8-14 μm) and produce images of that radiation, known as thermograms. Since infrared radiation is emitted by all objects (which are at temperature of above absolute zero), thermography makes it possible to see the environment with or without visible illumination. The amount of radiation emitted by an object increases with temperature; therefore, thermal imaging allows one to see variations in temperature. When viewed through a thermal imaging device such as a camera, warm objects stand out well against cooler backgrounds.

A thermal image is an image where each pixel represents the temperature of the respective surface area at the target. A digital thermal image is typically an array comprising a plurality of digital pixels. Usually, the number assigned to each pixel is proportional to the temperature at the respective target's surface area that corresponds to that pixel.

Non-specialized CCD (charge-coupled device) and CMOS (complementary metal-oxide-semiconductor) sensors have most of their spectral sensitivity within the wavelength range of 400-1000 nanometers.

Specialized thermal imaging devices use focal plane arrays (FPAs) that respond to longer wavelengths (i.e. 3-5 μm (MWIR), and 8-14 μm (LWIR), i.e. mid- and long-wavelength infrared radiation). The most common types are InSb, InGaAs, HgCdTe and QWIP FPA. The newest technologies use low-cost, uncooled microbolometers as FPA sensors. Their resolution is considerably lower than that of visible cameras and the thermal imaging cameras are much more expensive than their visible-spectrum counterparts.

As mentioned above, the current technology for uncooled thermal imaging used today is microbolometers. A microbolometer is a bolometer used as a detector in a thermal camera. Infrared radiation having wavelengths in the range of 8-14 μm is absorbed by the detector material, heating it up, and consequently causes a change in its electrical resistance. The resistance changes are measured and the measurement results are converted into equivalent temperature changes, which in turn are used for creating a thermal image.

Figure 1:
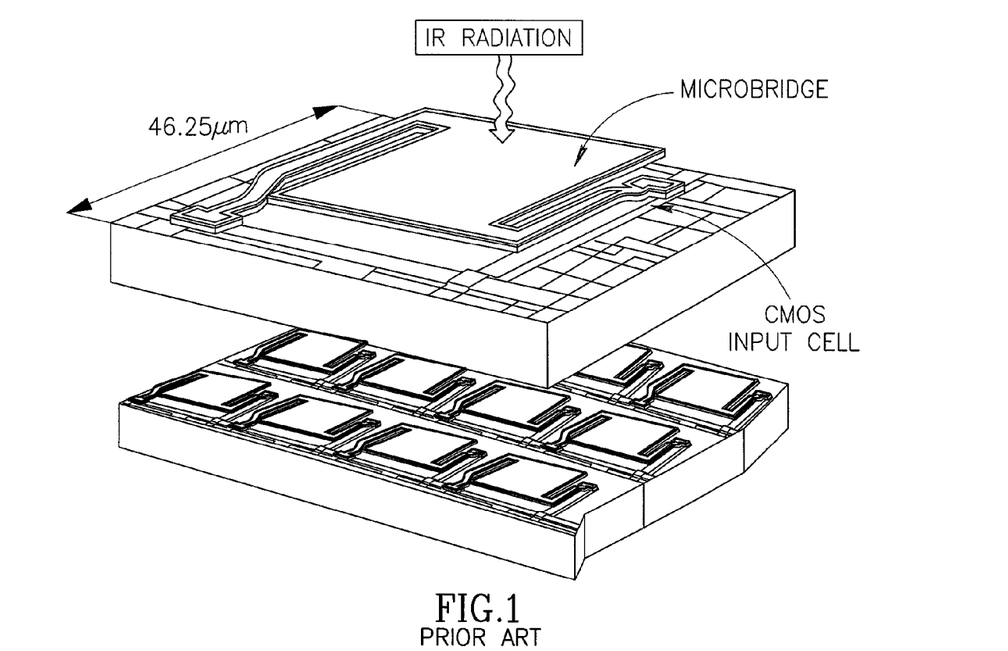
FIG. 1—is an example of a prior art device utilizing the microbolometric technology.

FIG. 1 is an example of a prior art device utilizing the microbolometric technology. The microbolometer sensor is a suspended resistor (referred to as micro-bridge in the Fig.), whose resistance varies with temperature. The read-out circuit is placed below the suspended structure. In most cases, an array of microbolometers is deployed in order to simultaneously generate an entire thermal image, wherein each microbolometer unit is used to generate a single pixel in the array. In other cases, a single pixel microbolometer is used in conjunction with a scanning mirror, thereby generating a virtual array.

However, this technology suffers from a number of drawbacks. Bolometers are typically suspended elements that must be packaged in a vacuum packaging, as it is part of the thermal isolation from adjacent bolometers. The process of fabricating and packaging bolometer arrays (also known as Focal Plane Array—FPAs) is a Micro-Electro-Machining-System (MEMS) process. It is not a CMOS or any other common semi-conductor process. Consequently, there are certain disadvantages associated with the manufacturing of such a device.

a. Production costs are high. A typical FPA cost is ten to thousand times more expensive than a CMOS process for the same die size.
b. Yield is relatively low. The bolometer MEMS structures are delicate and fragile. Moreover, as an FPA is an array of bolometer MEMS sensors, it is a pre-requisite that most of all sensors be functional. This is a difficult requirement to meet that translates to low production yields.
c. Sensitivity and response time. Bolometer sensors are based on gaining thermo-dynamic equilibrium with the respective surface area of the target. As the sensors have certain mass and specific heat capacity, it would take them a certain period of time to reach this state of equilibrium. The time period required for them to reach equilibrium, may be translated into video frame rate, which means that a bolometer imager has limited frame rate due to the sensors' mass and specific heat capacity.
d. Aging and drifting. Bolometer sensors, being fragile MEMS structures, change their electrical and mechanical properties over time. A typical FPA would drift significantly over a period of several years, thus causing degradation of its performance.
e. Lack of uniformity. The process of MEMS bolometer fabrication as mentioned above, results in large variance in performance of the device. This translates into a high degree of lack of uniformity in the image being generated. This lack of uniformity typically requires investing vast efforts for calibrating the device, as well as digital signal post-processing to correct the image being generated.

In view of the above, there is a need to obtain a low cost high sensitivity thermal imaging sensor that does not have the problems of the currently used sensors.

SUMMARY OF THE DISCLOSURE

The disclosure may be summarized by referring to the appended claims.

It is an object of the present disclosure to provide a method and device for implementing a novel thermal imaging approach.

It is another object of the present disclosure to provide a method and a device for obtaining a low cost, high sensitivity, thermal imaging sensor.

It is yet another object of the present disclosure to provide a method for manufacturing such a thermal imaging sensor which may be carried out by implementing standard industrial CMOS fabrication technology.

Other objects of the present invention will become apparent from the following description.

According to one embodiment of the disclosure, there is provided a method for generating a thermal image of a target. The method comprises the steps of:

at one or more electro-magnetic transducers, receiving long wave infra-red (LWIR) radiation emitted from the target at one or more wavelengths in the range of 8-14 μm;

illuminating the same one or more electro-magnetic transducers with radiation being transmitted at wavelengths that belong to one or more bands selected from among the Near Infra-Red (NIR) band and the visible (VIS) band;

converting at least part of the radiation received as LWIR radiation to energy at one or more bands selected from among the NIR band and the VIS band; and generating a thermal image based on the energy retrieved after converting at least part of the LWIR radiation received, to energy at one or more bands selected from among the NIR band and the VIS band.

Preferably, receiving the LWIR radiation and illuminating the one or more electro-magnetic transducers, are carried out simultaneously.

In accordance with another embodiment, the step of converting at least part of the radiation received as LWIR radiation, comprises conveying radiation received at the LWIR band and radiation received at the NIR band and/or at the VIS band, via a non-linear load.

By yet another embodiment, the step of converting at least part of the radiation received as LWIR radiation, comprises converting radiation received at the LWIR band and radiation received at the NIR band and/or at the VIS band into their electrical representation and multiplying them (e.g. by applying a mixer) by each other.

According to another aspect of the disclosure, there is provided a system for generating a thermal image of a target, wherein the system comprising:

at least one radiation source configured for generating radiation at one or more wavelengths that belong to one or more bands selected from among the Near Infra-Red (NIR) band and the visible (VIS) band;

at least one dual band antenna, configured to simultaneously collect long wave infra-red (LWIR) radiation emitted from the target at wavelengths in the range of 8-14 µm and to collect radiation being generated by the at least one radiation source;

at least one converter operative to convert at least part of the radiation received as LWIR radiation to energy at one or more bands selected from among the NIR band and the VIS band; and at least one processor (e.g. a sensor array, a CCD, and the like) configured to generate a thermal image based on the energy retrieved after converting at least part of the LWIR radiation received, to energy at the NIR band and/or at the VIS band.

By yet another embodiment of this aspect, the system further comprises a mixer having an electromagnetic part and an electronic part, wherein the mixer is configured to multiply the electric representations of the radiation received from both radiation sources there-between;

According to another embodiment, the system further comprising a non-linear load characterized in that its current-to-voltage response cannot be described by a linear equation. One option of such a non-linear load is using a Metal-Insulator-Metal (MIM) structure.

In accordance with another embodiment, the system provided further comprising a LWIR imaging optics configured to collect and focus LWIR energy to a focal point.

According to still another embodiment, the system further comprising an optical notch filter operative to isolate the LWIR radiation that had been converted to NIR/VIS energy, from NIR/VIS energy directly received from the at least one radiation source.

By yet another embodiment, the at least one radiation source is a monochromatic laser source.

According to another embodiment, the system comprising an antenna array which comprises a plurality of dual band antennas, wherein each of these antennas is individually coupled to a high-speed non-linear element, and configured to enable generating part of the thermal image.

In accordance with another embodiment, the system further comprising optical elements selected from a group that consists of lenses, mirrors, beam splitters and any combination thereof, to provide optical alignment of the incoming radiation from two sources, thereby directing the NIR/VIS rays to the same optical path as the LWIR rays.

By still another embodiment, in case that the illuminating radiation is transmitted at wavelengths that belong to the Near Infra-Red (NIR) band and to the visible (VIS) band, at least one of the one or more electro-magnetic transducers is a dual band electro-magnetic transducer.

BRIEF DESCRIPTION OF THE DRAWING

For a more complete understanding of the present invention, reference is now made to the following detailed description taken in conjunction with the accompanying drawings wherein.

DETAILED DESCRIPTION

In the following description, for the purposes of explanation, numerous specific details are set forth in order to provide a better understanding of the present invention by way of examples. It should be apparent, however, that the present invention may be practiced without these specific details.

Thermal radiation (also known as black-body radiation) is an electro-magnetic radiation, as presented in a theory described by Max Planck. According to this theory, the temperature of an object is proportional to the total amount of electro-magnetic radiation it emits to the environment.

In most cases, uncooled thermal imaging relates to the part (band) of the electro-magnetic radiation spectrum whose wavelength is in the range of 8-14 µm. This band is also referred to as Long Wave Infra-Red ("LWIR"). The LWIR band is almost transparent with a very low atmospheric attenuation. Thus, the losses from the emitting object to the imager, are rather minimal.

The method and device provided by the present disclosure rely on a basic principle of thermal imaging, namely, to receive the LWIR radiated energy transmitted from the target whose thermal image is being acquired and have it converted into energy at a different spectrum band, i.e. to energy at the Near Infra-Red ("NIR") band or at the Visible ("VIS") band. By applying such conversion of energy, much more energy per photon is gained (at the expense of less number of photons, due to energy conservation law). Such energetic photons may easily cause excitation (namely, photo-electric effect) of semi-conducting materials, and consequently can be easily detected by using existing VIS-NIR imaging sensors (e.g. CMOS sensors or CCD).

Figure 2:
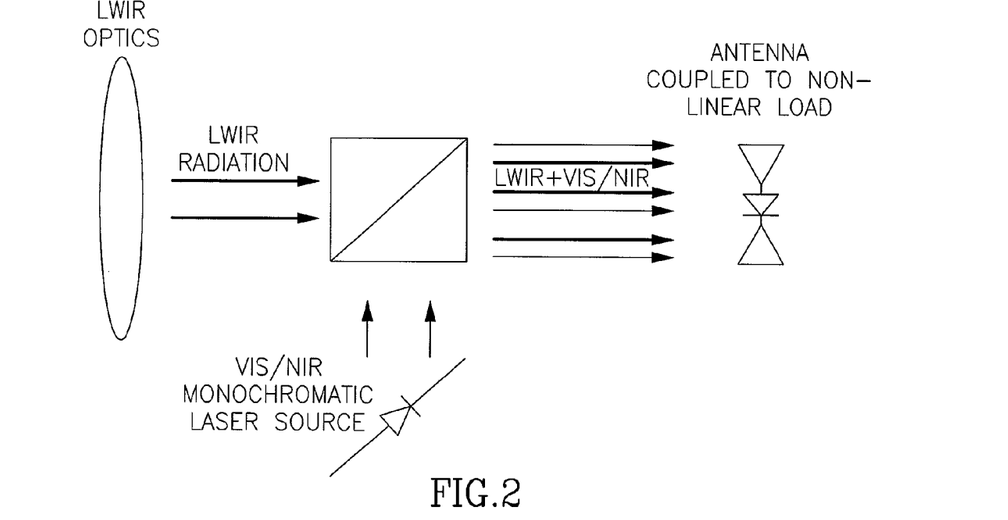
FIG. 2—is a schematic illustration of an example of a system construed according to an embodiment of the present invention.
Figure 3:
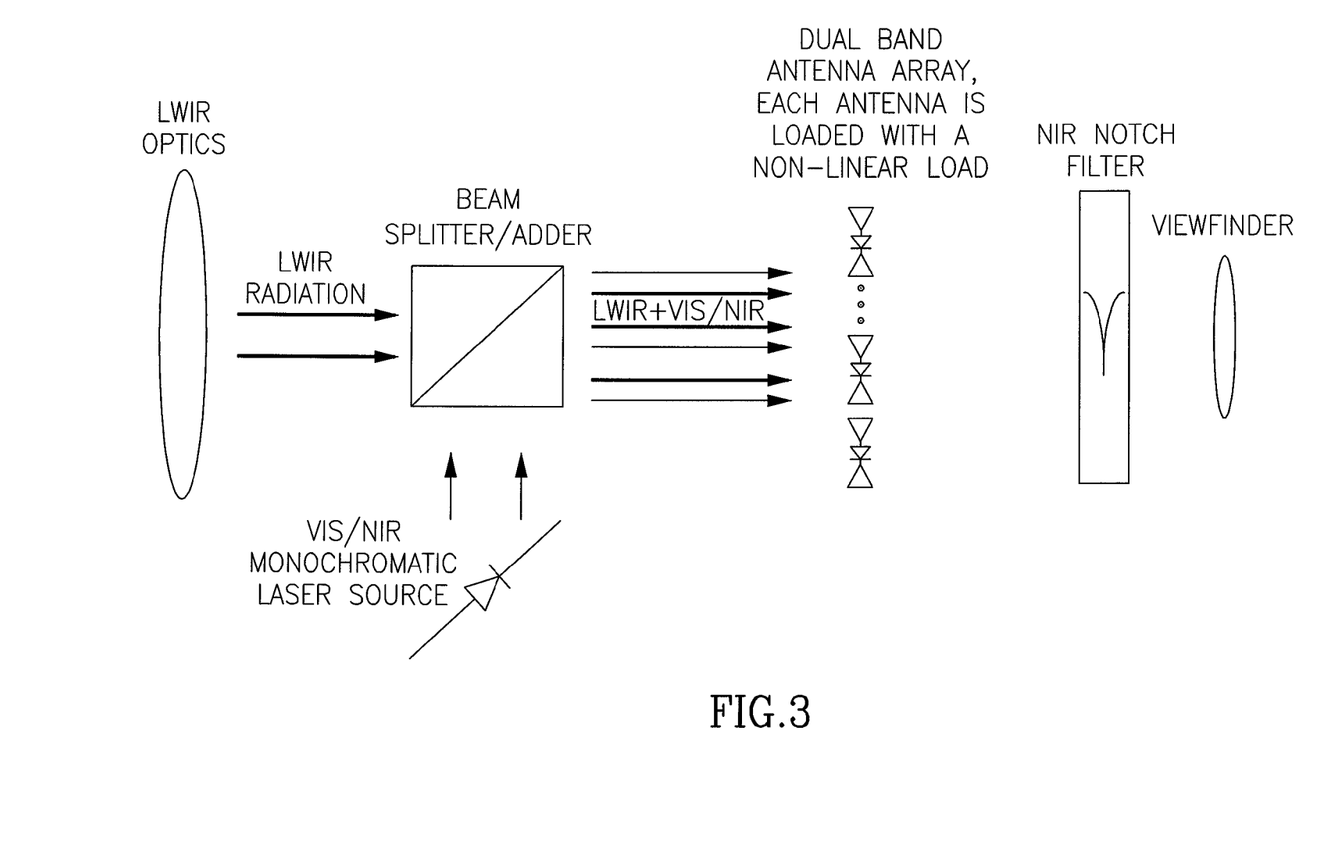
FIG. 3—is a schematic illustration of another example of a system construed according to an embodiment of the present invention.

FIG. 2 and FIG. 3 are schematic illustrations of examples of systems according to two embodiments of the present invention. As should be understood by those skilled in the art, both these FIGS. are provided only for the purpose of illustrating these two embodiments. Other configurations utilizing the same concept recited in this specification may also be possible and are thus encompassed by the present invention.

Also, it should be noted that the LWIR optical channel in FIG. 2 and in FIG. 3 is schematically presented as a singlet (single lens channel), whereas other LWIR optical channels may also be used in accordance with the present invention.

Furthermore, it should be noted that the laser source presented in FIG. 2 and in FIG. 3 is schematically illustrated as a Light Emitting Diode (LED), but obviously, the scope of the invention should not be understood as being restricted to the use of such a device.

Figure 4:
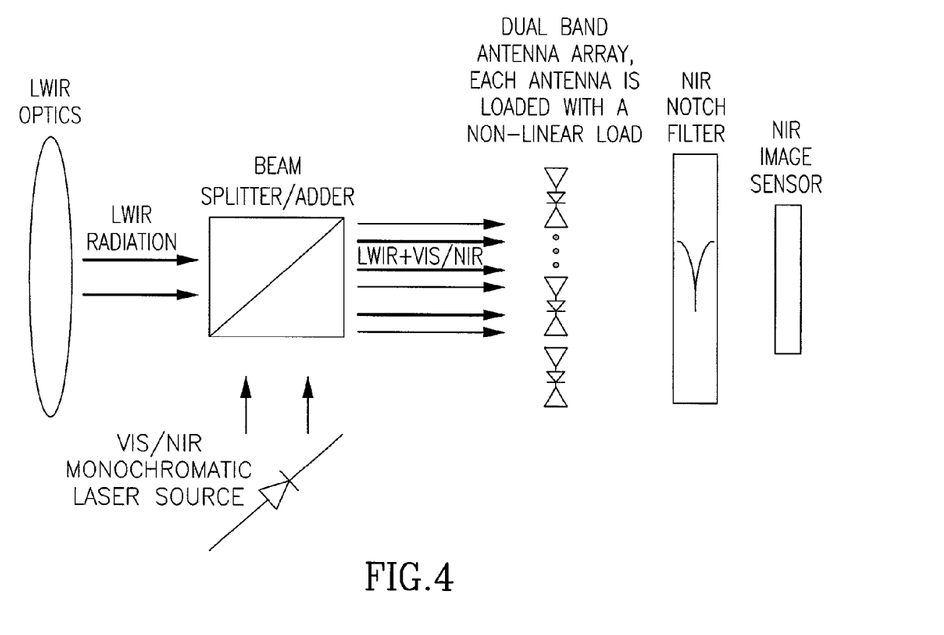
FIG. 4—demonstrates a schematic illustration of optical paths associated with a device used for obtaining a typical single pixel.

Moreover, a beam splitter is shown in FIGS. 2 to 4, which illustrate one way of adding up the power received at different wavelengths. As will be appreciated by those skilled in the art, there are other applicable ways to achieve this result which are known in the art per se, and they should be understood as being encompassed by the present invention.

As may be seen in these figures, LWIR imaging optics is used to collect and focus LWIR energy to a focal plane. A LWIR optical channel is used to focus the LWIR energy received from the target to a desired path of image processing. LWIR optical channels are well known basic elements in the field of thermal imaging. Off-the-shelf products may be used, or alternatively, dedicated elements may be designed to meet specific system requirements. LWIR imaging optics may be parameterized and characterized similarly to any other devices of imaging optics.

At that focal plane, an array of dual band antennas is located. The antenna array is illuminated by a VIS/NIR monochromatic light source (e.g. laser) and each antenna in this array is individually coupled to a high-speed non-linear element. It should be noted that the VIS/NIR illumination of the antenna is carried out simultaneously with the reception of the LWIR radiation thereat. These dual-band antennas of the array are configured to pick up the laser energy.

Let us assume for the sake of the example, that a NIR monochromatic laser illumination source which is optically aligned with the LWIR optical channel, is used. NIR monochromatic laser sources are commonly available from a variety of vendors, and can be purchased as off the shelf components. An example of such a laser source may be a 1.06 μm source.

The optical alignment mentioned above may be carried out by means of dedicated optical elements. The dedicated optical elements may be any combination of lenses, mirrors, beam splitters, dichroic mirrors and any other elements that may be used to direct the NIR rays along the same optical path as the path along which the LWIR rays are conveyed.

Unlike bolometers that may be used in a process of LWIR thermal imaging, a sensor element according to an embodiment of the present invention is an electro-magnetic transducer, e.g. a sensor which is antenna based, where each pixel of the thermal image is derived from an individual dual-band antenna. According to an embodiment of the disclosure, one of these two bands is LWIR band (i.e. 8-14 μm, ~21-37 THz). The LWIR band of the antenna will receive the thermal radiation energy as collected and focused by the optical channel. The other band is a higher band—preferably around 1 μm (~300 THz). In the alternative, it may be in any other VIS-NIR band. The purpose of the other band is to emit the converted LWIR energy, and preferably to collect the monochromatic energy from the IR illumination source.

At the feed point of the antenna, a non-linear electrical load is placed. Such a non-linear load may be any kind of load whose Current-to-Voltage response cannot be described by a linear equation. An example of such a load is a Metal-Insulator-Metal (MIM) structure. A MIM structure is a stack of two metals, having a very thin insulator separating between them. When the insulator is thin enough, a quantum effect referred to as "tunneling" occurs. In such a case, imposing voltage across the metals, results in a flow of current. It can be shown that MIM structures are non-linear (tunneling is an exponential phenomena), and may operate at up to 600 THz frequencies. Obviously, other non-linear loads may be possible, provided they exhibit very fast response times, and are encompassed within the scope of the present invention.

As mentioned above, each antenna in the array is a dual-band antenna, wherein one band is designed to collect LWIR energy (21-37 THz), while the other band is used to collect energy at 0.9-1.1 μm (~270-330 THz). The LWIR band antenna collects thermal energy which is conveyed (guided and focused) by the respective optical channel of the system. It should be noted that both the LWIR as well as the VIS/NIR sources, should preferably illuminate simultaneously the antenna.

The 1 μm band is actively interrogated by a dedicated laser. The antenna is actively illuminated by a narrow band coherent source, at a wavelength that is suitable to be absorbed by the respective antenna.

The result of setting a device that is configured to provide such an up-conversion effect, is a conversion of at least part of the energy received at LWIR wavelengths, to energy at the VIS/NIR band.

FIG. 4 demonstrates a schematic illustration of the optical paths associated with a device used for obtaining a typical single pixel of the thermal image.

It should be noted that LWIR and VIS/NIR radiations are preferably both aligned in accordance with the antenna radiation patterns, thereby enabling their optimal collection by each dual-band antenna.

The antenna shown in FIG. 4 is demonstrated as a differential bow tie antenna only for illustration purposes. As will be appreciated by those skilled in the art, other configurations are also possible, as long as they may serve as dual-band antennas, all without departing from the scope of the present invention.

Similarly, the non-linear load at the antenna feed point in FIG. 4 is presented as a diode only for illustration purposes.

According to the method described hereinabove, the antenna is simultaneously subjected to radiation emitted by the two independent sources:

a) LWIR energy conveyed from the target and focused by the LWIR optical channel; and b) VIS/NIR laser.

Figure 5:
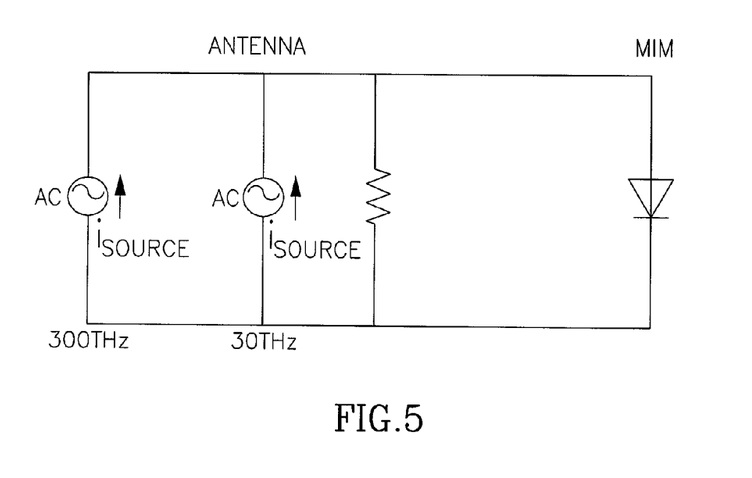
FIG. 5—is a schematic representation of an equivalent electrical circuit of system construed according to an embodiment of the present invention.

Both sources induce current on the antenna arms. FIG. 5 is a schematic representation of the equivalent electrical circuit. The two AC sources of FIG. are two current sources, representing the two energy bands as collected by the dual-band antenna. The resistor is a schematic representation of the antenna radiation resistance, whereas the diode in this FIG. is a schematic representation of the MIM (or any other non-linear load) placed at the antenna feed point.

As the two energy bands are collected simultaneously by the antenna, the energies are electrically summed, as they flow through the non-linear load. It can be shown that the non-linear load acts as a frequency mixer, providing a wide range of harmonies that result from the two collected bands.

The nature of the harmonic content of the energy across the non-linear load is heavily dependent on the details of the non-linear load I(V) curve but at least a portion of the LWIR energy will be up-converted to energy at the VIS/NIR range, according to the specific wavelength selected for the monochromatic laser illumination source.

Figure 6:
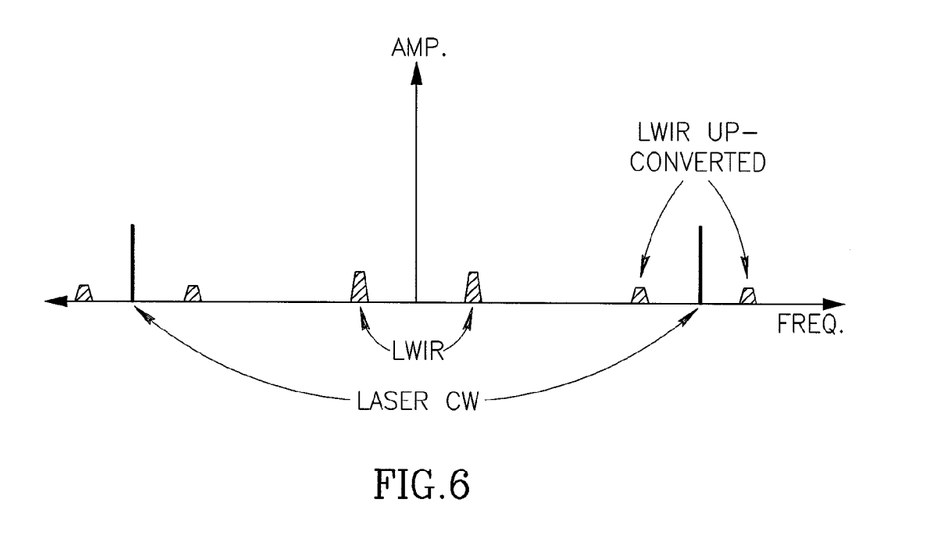
FIG. 6—is a partial presentation of the spectral content of the energy obtained across a non-linear load.

FIG. 6 is a partial presentation of the spectral content of the energy obtained across the non-linear load. It should be noted that this FIG. does not present the entire harmonic content, nor the correct proportions or amount of energy in each of the respective spectrum bands, but is merely shown for illustration purposes.

As may be seen from the schematic presentation in FIG. 5, part of the up-converted energy is dissipated at the resistor R which represents the radiation resistance of the dual-band antenna. Thus, part of the up-converted LWIR energy is radiated through the dual-band antenna, thereby converting the LWIR electro-magnetic energy into NIR/VIS energy.

In the device/system constructed according to the present disclosure, each single dual-band antenna that is coupled to a single non-linear element, functions as a mixer of the absorbed electro-magnetic fields. Under the assumptions that the antenna is well designed, and that the non-linear element is high speed enough, the unit may serve as a converter for LWIR radiation to VIS/NIR band.

A plurality of such elements may be used to form an array of dual band antennas, wherein each antenna is coupled to its own non-linear load. Moreover, by placing the array at the focal point of LWIR imaging optics and illuminating the entire array with VIS/NIR CW laser, the entire LWIR image can be converted to VIS/NIR band.

Figure 7:
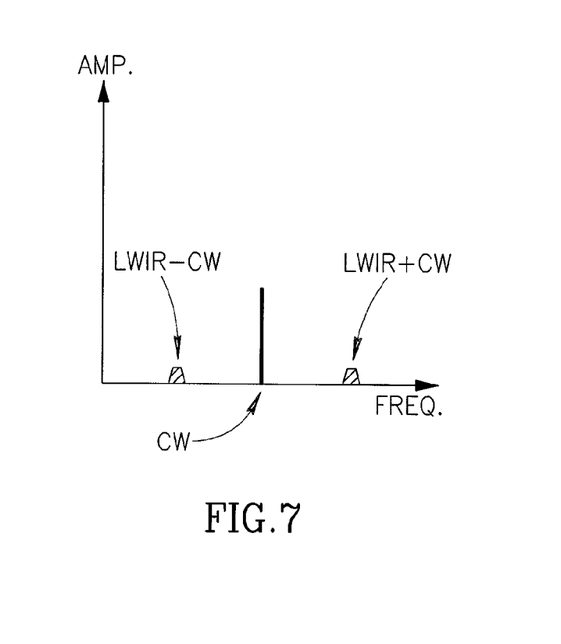
FIG. 7—exemplifies part of the spectrum presented in FIG. 6.

The energy backscattered from the antenna comprises very rich spectral content. As mentioned above, the constituents of this spectral content are heavily dependent on the non-linear properties of the antenna load. FIG. 7 serves as an example of part of the spectrum presented in FIG. 6.

As seen in FIG. 7, there are two bands surrounding the VIS/NIR laser carrier wave (CW): LWIR+CW and LWIR-CW. Both are proportional to the LWIR energy as absorbed by the dual band antenna.

Since the main interest in the examples described above is to obtain LWIR imaging, one should preferably suppress the CW component of energy. To do that, a band stop optical notch filter is placed opposite the antenna array. The band stop optical notch filter is configured to absorb the CW energy, and to transmit (or to reflect) the up-converted LWIR energy.

In order to obtain the thermal image required, there are certain possible processing options that may be adopted.
  a. Using an imaging lens: by this embodiment, the up-converted LWIR energy is optically processed via an imaging lens, to create a visible image whose intensity is proportional to the LWIR image processed by the LWIR optical channel. This option is demonstrated in FIG. 3.
  b. Using an image sensor (e.g. CCD or CMOS sensor) to create an electrical video signal from the up-converted LWIR image. VIS/NIR image sensors are typically very sensitive devices, and as such may provide good video images even if their input energy is rather low. This option is presented in FIG. 2.

As will be appreciated by those skilled in the art, the method and devices described hereinabove demonstrate meaningful advantages over the existing thermal imaging technologies. To name but few,
  a. VIS/NIR image sensors used according to the present disclosure are much cheaper and are attainable as off-the-shelf components. The system provided may be implemented very easily, using low cost components—resulting in a relatively very low cost thermal imaging system.
  b. VIS/NIR image sensors are very sensitive (some of them may detect as little as 10 photons or even less). Therefore, an efficient up-conversion mechanism as described herein provides a highly sensitive thermal imaging system.
  c. The system does not require use of temperature sensors. Unlike the use of bolometers based technology, the present system does not require any kind of vacuum packaging as part of its applicability. This fact translates directly to easier manufacturing, low costs and high yield.
  d. The proposed system is easily scalable from low resolution to high resolution imaging systems. Overall system resolution is dictated by the up-conversion array size, and the VIS/NIR imager size. Both factors are easily scalable.

In this disclosure, the term "comprising" is intended to have an open-ended meaning so that when a first element is stated as comprising a second element, the first element may also include one or more other elements that are not necessarily identified or described herein, or recited in the claims.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for generating a thermal image of a target, said method comprising the steps of:
  at one or more electro-magnetic transducers, receiving long wave infra-red (LWIR) radiation emitted from the target at one or more wavelengths in the range of 8-14 μm;
  illuminating said one or more electro-magnetic transducers with radiation being transmitted at wavelengths that belong to Near Infra-Red (NIR) band and/or that at one or more wavelengths that belong to the visible (VIS) band;
  converting at least part of the radiation received as LWIR radiation to energy at the NIR band and/or at the VIS band; and
  generating a thermal image based on the energy retrieved after converting at least part of the LWIR radiation received, to energy at the NIR band and/or at the VIS band, and wherein receiving LWIR radiation and illuminating said one or more electro-magnetic transducers, are carried out simultaneously.

2. The method of claim 1, wherein the step of converting at least part of the radiation received as LWIR radiation, comprises conveying radiation received at the LWIR band and radiation received at the NIR band and/or at the VIS band, via a non-linear electrical load.

3. The method of claim 1, wherein the step of converting at least part of the radiation received as LWIR radiation, comprises converting radiation received at the LWIR band and radiation received at the NIR band and/or at the VIS band into their electrical representation and multiplying them by each other.

4. The system of claim 1, wherein illuminating radiation is transmitted at wavelengths that belong to the Near Infra-Red (NIR) band and to the visible (VIS) band, at least one of the one or more electro-magnetic transducers is a dual band electro-magnetic transducer.

5. A system for generating a thermal image of a target, wherein said system comprising:

at least one radiation source configured to generate radiation at one or more wavelengths that belong to Near Infra-Red (NIR) band and/or one or more wavelengths that belong to the visible (VIS) band;

at least one dual band antenna, configured to simultaneously collect long wave infra-red (LWIR) radiation emitted from the target and having wavelengths in the range of 8-14 µm, and to collect radiation being generated by the at least one radiation source;

at least one converter operative to convert at least part of the radiation received as LWIR radiation to energy at the NIR band and/or at the VIS band; and at least one processor configured to generate thermal image based on the energy retrieved after converting at least part of the LWIR radiation received, to energy at the NIR band and/or at the VIS band.

6. The system of claim 5, further comprising a mixer having an electromagnetic part and an electronic part, and configured to multiply the electric representations of the radiation received from both radiation sources there-between.

7. The system of claim 5, further comprising a non-linear load characterized in that its current-to-voltage response cannot be described by a linear equation.

8. The system of claim 7, wherein said non-linear load comprises a Metal-Insulator-Metal (MIM) structure.

9. The system of claim 5, further comprising a LWIR imaging optics configured to collect and focus LWIR energy to a focal point.

10. The system of claim 5, further comprising an optical notch filter operative to isolate the converted LWIR radiation that had been to NIR/VIS energy, from NIR/VIS energy received from the at least one radiation source.

11. The system of claim 10, wherein said at least one radiation source is a monochromatic laser source.

12. The system of claim 5, wherein said system comprising an array comprising a plurality of dual band antennas, wherein each of said antennas is individually coupled to a high-speed non-linear element, and configured to enable generating part of the thermal image.

* * * * *